United States Patent
White

(10) Patent No.: US 10,962,169 B1
(45) Date of Patent: Mar. 30, 2021

(54) CELL PHONE POPUP DUAL RING CLIP

(71) Applicant: Jessica White, Portland, OR (US)

(72) Inventor: Jessica White, Portland, OR (US)

(*) Notice: Subject to any disclaimer, the term of this patent is extended or adjusted under 35 U.S.C. 154(b) by 0 days.

(21) Appl. No.: 16/696,483

(22) Filed: Nov. 26, 2019

(51) Int. Cl.
| | |
|---|---|
| *F16M 13/00* | (2006.01) |
| *H04M 1/04* | (2006.01) |
| *F16M 11/10* | (2006.01) |
| *F16M 13/02* | (2006.01) |
| *F16M 11/38* | (2006.01) |
| *G06F 1/16* | (2006.01) |

(52) U.S. Cl.
CPC .......... *F16M 13/005* (2013.01); *F16M 11/10* (2013.01); *F16M 11/38* (2013.01); *F16M 13/02* (2013.01); *H04M 1/04* (2013.01); *G06F 1/1626* (2013.01)

(58) Field of Classification Search
CPC ...... F16M 13/005; F16M 13/02; F16M 11/38; F16M 11/10; H04M 1/04; G06F 1/1626
USPC ....................................................... 455/575.1
See application file for complete search history.

(56) References Cited

U.S. PATENT DOCUMENTS

| | | | | |
|---|---|---|---|---|
| 5,916,283 | A * | 6/1999 | Steinbach | A44B 15/00 70/38 A |
| 2012/0311827 | A1* | 12/2012 | Wilson | A45F 5/10 24/304 |
| 2015/0257288 | A1* | 9/2015 | Livernois | H04B 1/3877 248/346.06 |
| 2019/0245960 | A1* | 8/2019 | Nahum | F16M 13/00 |
| 2020/0083921 | A1* | 3/2020 | Hogue | A45F 5/00 |

* cited by examiner

*Primary Examiner* — Eugene Yun
(74) *Attorney, Agent, or Firm* — Lyman Moulton, Esq.; Moulton Patents, PLLC

(57) ABSTRACT

A cell phone holding tool includes a dual ring of concentric rings configured to receive a user's finger therethrough and to separate to clip to a vent fin in a vehicle. A push-pull bellows includes a top and a base configured to collapse and to popout from a back of a cell phone where it is mounted. The phone holding tool additionally includes a pivot configured to swivel 360 degrees within the top of the bellows, the pivot configured to lock into place when pushed into the popping bellows. A bracket hinge is configured hold and to tilt the dual ring forward and backward at a variable angle and connect to the dual ring to the pivot. A low durometer clear plastic tubing disposed over each of the concentric rings to provide a clipping friction with the vent fin of the vehicle.

20 Claims, 3 Drawing Sheets

CELL PHONE POPUP DUAL RING CLIP

BACKGROUND OF THE INVENTION

Whether you have trouble navigating the large screen on your mobile device or you're just terrified of dropping that smartphone you paid a small fortune for, you'll want to invest in some sort of phone grip. Some prefer style while others prefer durability but all items must be designed for various models, including Apple and Android products, with some that even do double-duty as kickstands and wallets, too.

Conventional grips available on the market lack certain of all popular features. There is a need in the market for a grip which is easy to use, stylish and economical.

SUMMARY OF THE INVENTION

A cell phone holding tool including a dual ring comprising a set of concentric rings configured to receive a user's finger therethrough and to separate to clip to a vent fin in a vehicle. The cell phone holding tool also includes a push-pull bellows comprising a top and a base configured to collapse and to popout from a back of a cell phone where it is mounted. The phone holding tool additionally includes a pivot configured to swivel 360 degrees within the top of the bellows, the pivot configured to lock into place when pushed into the popping bellows. The phone holding tool further includes a bracket hinge configured hold and to tilt the dual ring forward and backward at a variable angle and connect to the dual ring to the pivot. The phone holding tool yet includes a low durometer clear plastic tubing disposed over each of the concentric rings to provide a clipping friction with the vent fin of the vehicle.

A method for holding a phone via a tool, the method including receiving one of a user's finger there through and a vent fin of a vehicle there between a dual ring comprising a set of concentric rings. The method also includes pushing and pulling a bellows comprising a top and a base configured to collapse and to popout from a back of a cell phone where it is mounted. The method additionally includes swiveling the dual ring 360 degrees within the top of the bellows and locking it into place via a pivot pushed into the bellows. The method further includes holding and tilting the dual ring forward and backward at a variable angle via a bracket hinge connecting the dual ring to the pivot.

Other aspects and advantages of embodiments of the disclosure will become apparent from the following detailed description, taken in conjunction with the accompanying drawings, illustrated by way of example of the principles of the disclosure herein.

Figure 1:
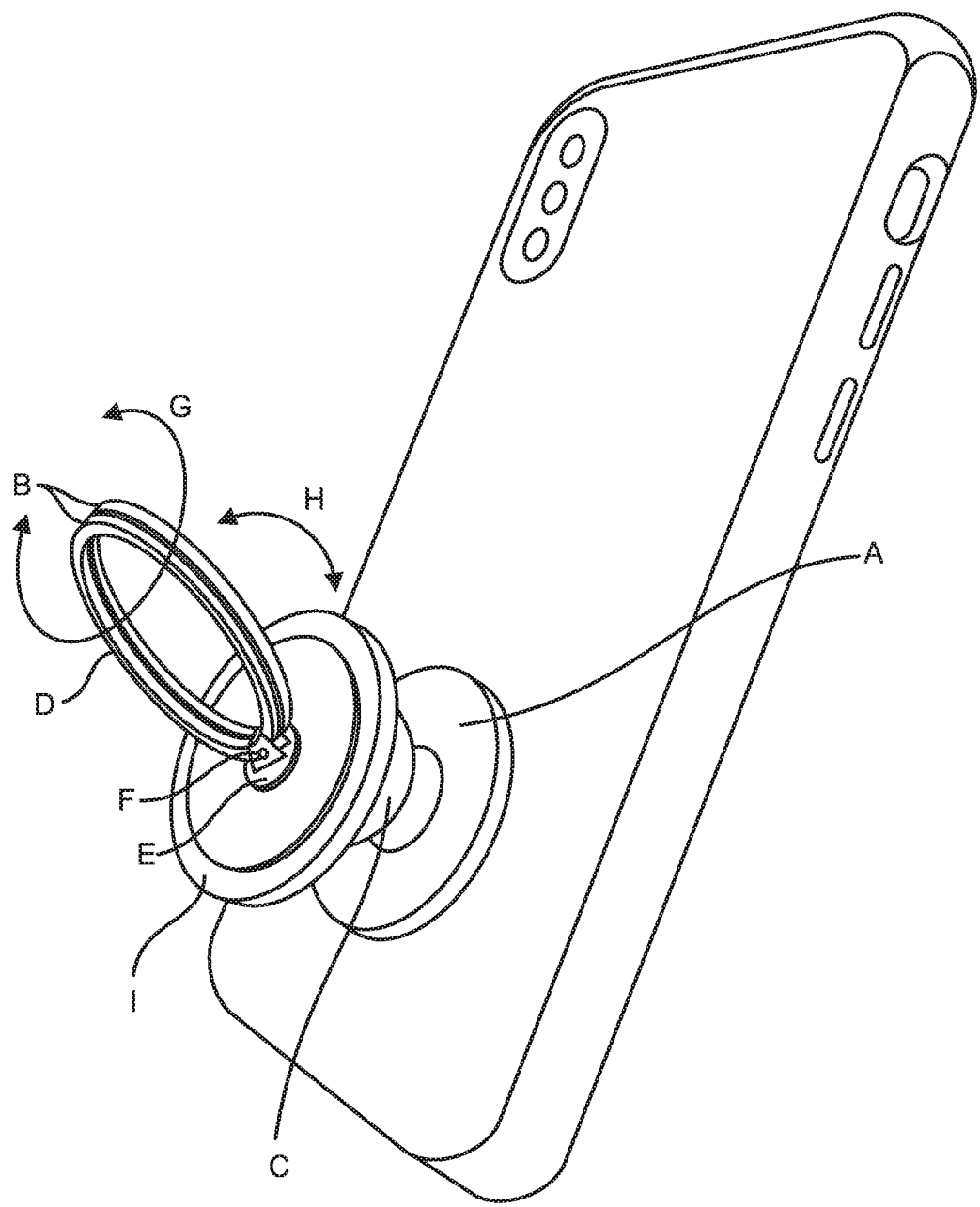
FIG. 1 is a perspective depiction of the cell phone popup dual ring clip component members in accordance with an embodiment of the present disclosure.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

Throughout the present disclosure, the term "clip" refers to the ability of a component of the disclosure to fasten or adhere to something else via a friction fit grip, particularly to a vent fin. Also throughout the present disclosure, the term "push-pull" in a conventional sense refers to a digital action to push or to pull a top of the bellows in a popout and collapse action.

FIG. 1 is a perspective depiction of the cell phone popup dual ring clip component members in accordance with an embodiment of the present disclosure. The depiction includes the cell phone, the popup billows base A, the dual ring of concentric rings B, the bellows body C, the clear plastic tubing over the concentric rings D, the pivot E in the top of the bellows, the bracket hinge F, the 360 degree swivel rotation arrows G around the pivot E and the 0 to 180 degree tilt arrows H around the hinge bracket F and the top of the bellows I.

Figure 2:
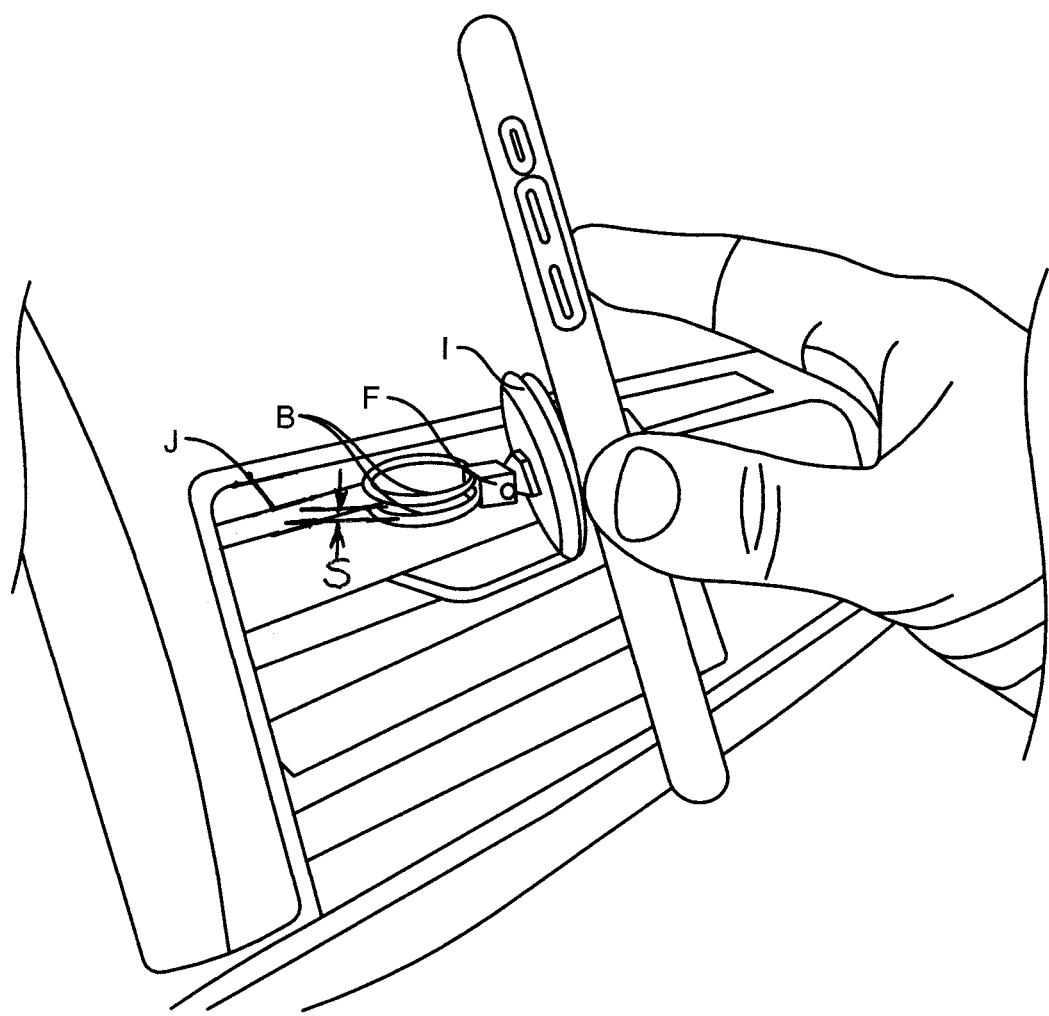
FIG. 2 is a depiction of the cell phone popup dual ring clip being clipped to a vehicle air vent fin in accordance with an embodiment of the present disclosure.

FIG. 2 is a depiction of the cell phone popup dual ring clip being clipped to a vehicle air vent fin in accordance with an embodiment of the present disclosure. The depiction includes same and similar components to those in FIG. 1 and same reference letters or numbers with the addition of the vent fin J that the dual ring clips onto for display and use in a vehicle. The bellows C is collapsed onto the base A, showing only the bellows top I. The separation S shown from a bottom of a first (top) ring to the top of the second (bottom) ring of the dual rings shown enables an annular tension on the vehicle air vent via the bracket hinge holding the dual rings.

Figure 3:
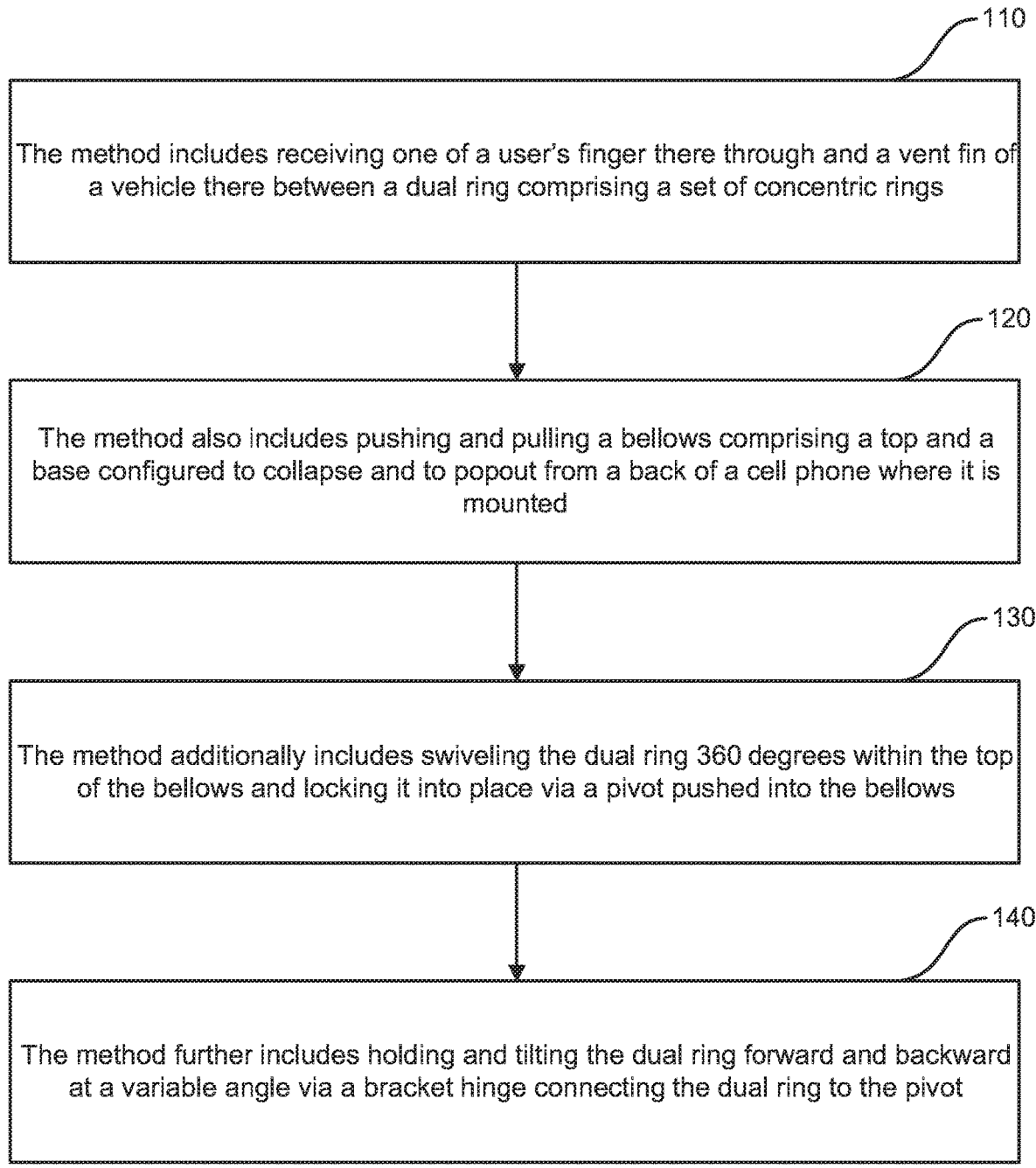
FIG. 3 is a block diagram of a method of holding and operating the cell phone popup dual ring clip in accordance with an embodiment of the present disclosure.

FIG. 3 is a block diagram of a method of holding and operating the cell phone popup dual ring clip in accordance with an embodiment of the present disclosure. A method for holding a phone via a tool, the method including receiving 110 one of a user's finger there through and a vent fin of a vehicle there between a dual ring comprising a set of concentric rings. The method also includes pushing and pulling 120 a bellows comprising a top and a base configured to collapse and to popout from a back of a cell phone where it is mounted. The method additionally includes swiveling 130 the dual ring 360 degrees within the top of the bellows and locking it into place via a pivot pushed into the bellows. The method further includes holding and tilting 140 the dual ring forward and backward at a variable angle via a bracket hinge connecting the dual ring to the pivot.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. A cell phone holding tool comprising:
   a dual ring comprising a set of separate and concentric rings configured to receive a user's finger therethrough and to separate in an annular tension defined by a separation 'S' to clip to a vent fin in a vehicle;
   a push-pull bellows comprising a top and a base configured to collapse and to popout from a back of a cell phone where it is mounted;
   a pivot configured to swivel 360 degrees within the top of the bellows, the pivot configured to lock into place when pushed into the popping bellows; and
   a bracket hinge configured hold and to tilt the dual ring forward and backward at a variable angle and connect to the dual ring to the pivot.

2. The tool of claim 1, wherein the dual ring separates annularly a space 'S' up to a diameter thereof at the bracket hinge on the pivot, the separation configured to accommodate a clipping to the vent fin of the vehicle.

3. The tool of claim 1, wherein each of the concentric rings in the dual ring comprises a low durometer piping therearound configured to provide friction with the vent fin of the vehicle.

4. The tool of claim 1, wherein the push-pull billows is configured to temporarily lock in a popout position and to temporarily lock in a collapsed position based on a magnitude of a push-pull force applied thereto greater than an internal friction at rest.

5. The tool of claim 1, wherein the base is attached to the back of the cell phone via one of an adhesive and a magnet.

6. The tool of claim 1, wherein the pivot is configured as a pedestal to swivel 360 degrees above the top of the bellows and remain in contact with the top via a lower portion of the pedestal and to push in and lock in place flush with the top of the bellows.

7. The tool of claim 1, wherein the bracket hinge is configured to bracket the concentric rings in annular tension and enable an annular separation 'S' up to a diameter thereof by a divisive force of a vent fin there between.

8. The tool of claim 1, wherein the bracket hinge is configured to tilt and to lock the dual ring in an angle of 90 degrees and 45 degrees with respect to the back of the cell phone for display purposes.

9. The tool of claim 1, wherein the bellows is shaped as a circular pedestal.

10. The tool of claim 1, wherein the bellows comprises concentric rings of graduated diameters and a skin configured to retain the rings.

11. A method for holding a phone via a tool, the method comprising:
    receiving one of a user's finger there through and a vent fin of a vehicle there between a dual ring comprising a set of separate and concentric rings in an annular tension defined by a separation 'S';
    pushing and pulling a bellows comprising a top and a base configured to collapse and to popout from a back of a cell phone where it is mounted;
    swiveling the dual ring 360 degrees within the top of the bellows and locking it into place via a pivot pushed into the bellows; and
    holding and tilting the dual ring forward and backward at a variable angle via a bracket hinge connecting the dual ring to the pivot.

12. The method of claim 11, further comprising separating the dual ring annularly a space 'S' up to a diameter thereof, the separating configured to accommodate a clipping to the vent fin of the vehicle.

13. The tool of claim 11, further comprising applying a push-pull force greater than an internal friction at rest to the top of the billows to temporarily lock it a popout position and to temporatily lock it in a collapsed position.

14. The method of claim 11, swiveling the dual ring up to 360 degrees via the pivot as a pedestal above the top of the bellows and locking it into place flush with the top of the bellows via a push force.

15. The method of claim 11, further comprising clipping the dual ring onto a vent fin of a vehicle via a bracketing hinge holding the separate and concentric rings in annular tension defined by 'S' via the bracket hinge.

16. The method of claim 11, further comprising collapsing the bellows and clipping the dual ring onto a vent fin of a vehicle via the concentric rings in annular tension defined by 'S' via the bracket hinge.

17. The method of claim 11, further comprising displaying a front of the phone screen via tilting the dual rings at an angle of 45 degrees with respect to the back of the phone.

18. The method of claim 11, further comprising clipping the dual ring onto a vent fin of a vehicle via the concentric rings in annular tension defined by 'S' via the bracket hinge and rotating a display angle of the cell phone via the swiveling pivot.

19. The method of claim 18, further comprising locking the cell phone into the display angle via pushing the cell phone onto the vent fin and locking the pivot into place.

20. A cell phone holding tool comprising:
    a dual ring comprising a set of separate and concentric rings configured to receive a user's finger therethrough and to separate to clip to a vent fin in a vehicle in an annular tension defined by a separation 'S';
    a push-pull bellows comprising a top and a base configured to collapse and to popout from a back of a cell phone where it is mounted;
    a pivot configured to swivel 360 degrees within the top of the bellows, the pivot configured to lock into place when pushed into the popping bellows; and
    a bracket hinge configured hold and to tilt the dual ring forward and backward at a variable angle and connect to the dual ring to the pivot; and
    a low durometer clear plastic tubing disposed over each of the concentric rings to provide a clipping friction with the vent fin of the vehicle.

\* \* \* \* \*